INVENTORS.
EUGENE B. OSUCH
FREDERIC N. EATON
BY
ATTORNEY.

United States Patent Office 3,167,245
Patented Jan. 26, 1965

3,167,245
AIR DENSITY COMPUTER
Eugene B. Osuch, 2182 N. Grand Oaks, Altadena, Calif., and Frederic N. Eaton, 1271 E. Howard St., Pasadena, Calif.
Filed Aug. 8, 1961, Ser. No. 130,200
8 Claims. (Cl. 235—61)
(Granted under Title 35, U.S. Code (1952), sec. 266)

The invention described herein may be manufactured and used by or for the Government of the United States of America for governmental purposes without the payment of any royalties thereon or therefor.

This invention relates to apparatus for determining the density of air from its pressure, wet and dry bulb temperatures.

In the field of ballistics it is often necessary to determine the density of the air which then becomes a factor in determining the range and trajectory of a missile. With this information, the missile may then be caused to more closely follow the calculated or optimum trajectory. Weather stations, also, require this information for weather predictions and other purposes. In the prior art it has been the practice to measure the variables referred to by suitable instruments and from such data calculate air density by mathematical formula or determine it from charts or slide rules.

The principal object of this invention is to provide apparatus into which known air data may be set and its density directly read on a dial.

Another object is to provide apparatus in accordance with the preceding object which is simple in construction, economical of manufacture and highly reliable in operation.

Further objects, advantages, and salient features will become more apparent from the description to follow, the accompanying claims and the appended drawing, in which:

Figure 1:
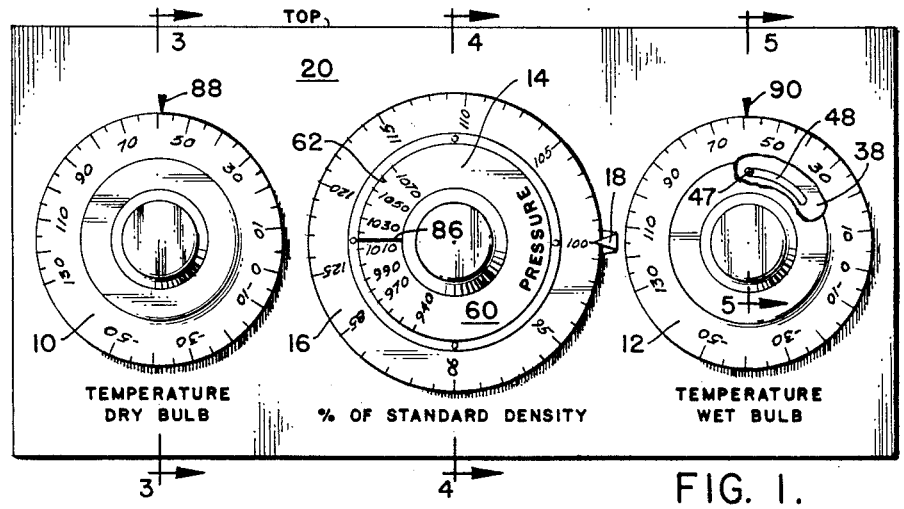
FIG. 1 is a front elevation of apparatus forming the subject of the invention.
Figure 2:
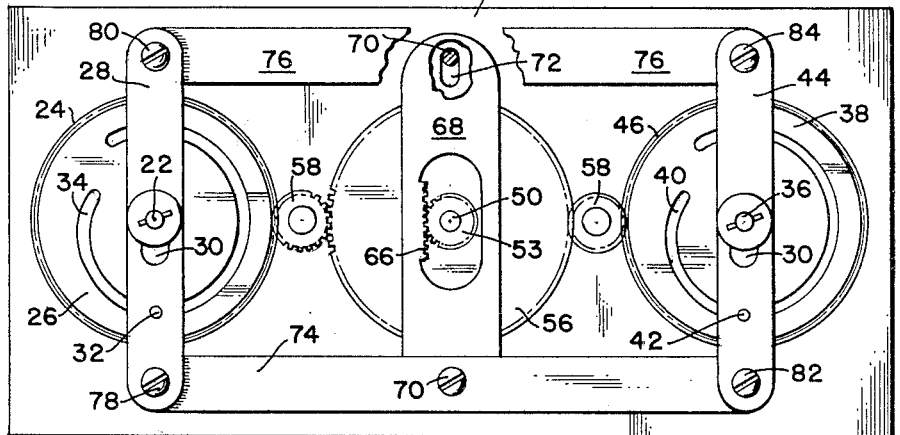
FIG. 2 is a rear elevation as viewed by rotating FIG. 1 180° in a vertical plane.
Figure 3:
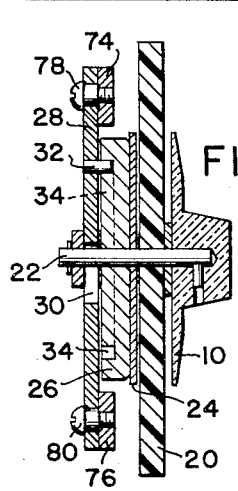
FIG. 3 is a section taken on line 3—3, FIG. 1.
Figure 4:
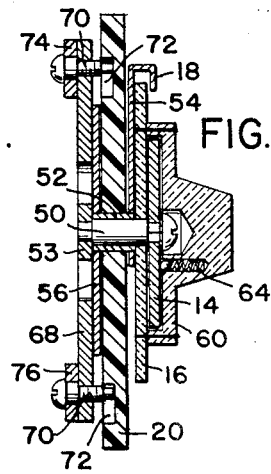
FIG 4 is a section taken on line 4—4, FIG. 1.
Figure 5:
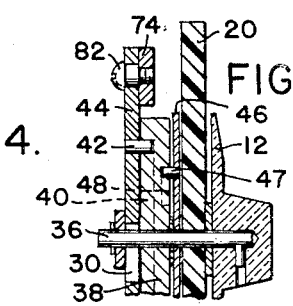
FIG. 5 is a section taken on line 5—5, FIG. 1.

Referring now to the drawing the invention comprises, in brief, a dial 10 graduated to read dry bulb temperature, a dial 12 graduated to read wet bulb temperature, a dial 14 graduated to read atmospheric pressure, and a dial 16 graduated to read a measure of air density. The units chosen on dials 10, 12 are degrees Fahrenheit, on dial 14 pressure in milibars, and on dial 16 density in percentage of standard density, which latter is taken as 100% humidity, 59° F. and 1013 millibars (29.92 inches of mercury). When the three values are set, the percentage of standard density may be read on dial 16 adjacent pointer 18. Each dial may be moved independently of the others and as values are changed on it they automatically set a new value adjacent the pointer. The manner in which these dials are mechanically interconnected to produce such result will now be described in detail.

The support for all of the apparatus comprises a frame member in the form of a plate 20. Dial 10 is secured to a shaft 22, journaled in the plate, the shaft having affixed thereto, at the rear face of the plate, a gear 24 and a cam plate 26, the shaft, gear and cam plate all being rotatable as a unit. A fulcrum link 28, having an elongated slot 30 at its center and through which shaft 22 extends is disposed adjacent the cam plate and is connected to the latter by a pin 32, carried by the link, which engages in a spiral cam slot 34 which is recessed into one face of the cam plate. Thus, as the dial is rotated the spiral cam slot causes pin 32 to move along a substantially radial path imparting movement to the link.

Dial 12 is similarly affixed to a shaft 36 journaled in the plate, the shaft being affixed to a cam plate 38 which is provided with a spiral cam groove 40 which engages a pin 42 carried by a fulcrum link 44 which is mounted in the same manner as link 28. Gear 46, unlike gear 24, is mounted to rotate on shaft 36 so that the gear and cam plate may rotate relatively. A pin 47, carried by gear 46, engages an arcuate slot 48 in cam plate 38 to limit such relative motion. This lost motion connection prevents inadvertently reversing the settings of dry and wet bulb data and ensures that the wet bulb setting never exceeds the dry bulb setting. Within the ranges of temperature illustrated the wet bulb reading may be depressed below the dry bulb reading by about 30° F. As will be apparent, it may be omitted if the safeguard against inadvertent dial settings is not desired.

Dial 14 is secured to a shaft 50, journaled within a sleeve 52 which is journaled for rotation by the plate, shaft 50 having a pinion gear 53 affixed to it and the sleeve having a pointer arm 54 affixed to it which carries pointer 18. A gear 56 is affixed to the sleeve and rotates with gears 24 and 46 through idler gears 58, journaled to the plate. Dial 16 is mounted for rotation on shaft 50 and is provided with a transparent plate 60 through which graduations 62 on dial 14 may be viewed. A friction slip clutch in the form of a spring detent 64 may be provided, if desired, to rotationally connect dials 14 and 16.

Pinion gear 53 meshes with a rack 66 carried by a fulcrum link 68, the latter being provided with pins 70, 70 which engage in slots 72, 72 in the plate to thereby constrain link 68 to rectilinear movement in the longitudinal direction of these slots. For convenience of orientation of parts, this may be considered as a vertical direction. A pair of horizontal levers 74, 76 are pivotally connected to fulcrum link 68 by the pins 70, 70 and to fulcrum links 28, 44 by pivot pins 78, 80 and 82, 84.

Since the distances between the axes of pivot pins 70, 70; 78, 80; and 82, 84 are equal, and since link 68 is constrained to move rectilinearly it will be apparent that the various links form a parallelogram linkage with links 28 and 44 always remaining parallel to link 68. Since the perpendicular distances from links 28 and 44 to link 68 varies slightly during movement of the parts, the slots 30, 30 in links 28, 44 are provided to permit such movement by preventing engagement of shafts 22, 36 with the walls of the respective slots.

In the operation of the device it will be assumed that the dry and wet bulb temperatures and the air pressure have been measured by suitable conventional instruments. While these three values may be set on the dials in any desired order it will be assumed that the pressure is first set on dial 14 by rotating index 86 on transparent plate 60 to the proper graduation on dial 14. The friction clutch permits the relative movement between these dials and after being so set they thereafter rotate together without changing this setting. Next, dial 10 is rotated to a position such that index 88 is opposite the dry bulb temperature. Rotation of dial 10 rotates cam plate 26 which, through pin 32 and cam slot 34 moves link 28 in a substantially vertical direction. Since gear 24 also rotates with cam plate 26 and all gears rotate in unison, the rotation is transmitted to central gear 56, which rotates arm 54 and pointer 18 to a certain position; also, gear 46 is rotated, rotating pin 47. If pin 47 is intermediate the ends of arcuate slot 48 no rotary motion is transmitted to cam plate 38 hence link 44 does not move. With no movement of link 44, links 74, 76 will pivot about pivot pins 82, 84 and as link 28 moves vertically it will transmit motion to link 68 through pivot pins 70, 70, moving link 68 and rack 66 in a vertical direction thus rotating pinion 53 and dials 14, 16 in unison to a certain position. In event the rotation of dial 10 moves pin 47 to the end of slot 48 then cam plate 38 will also be rotated moving link 44 in a vertical direction. The amount of movement of link 68 will then depend on the amount of movement of both of links 28 and 44. Lastly, dial 12 is rotated to place the wet bulb temperature opposite index 90. Assuming that pin 47 is at one end of slot 48, dial 12 may now be rotated an angular distance equal to the angular extent of the slot without rotating gear 46. This angular distance, as previously referred to, provides setting a wet bulb temperature onto the dial which is less than dry bulb temperature. Since gear 46 does not rotate during this setting, the dry bulb dial will remain in its original set position. The rotation does, however, rotate cam plate 38, moving pin 42 and link 44 in a vertical direction. Links 74, 76 now rotate about pivot pins 78, 80 imparting vertical movement to link 68, which, through the rack and pinion, rotate pointer 18 to the final position. The reading on dial 16 adjacent the pointer is the percentage of standard density, the end desired result.

If it were assumed that the dry and wet bulb temperatures were invariably set on their respective dials it now becomes apparent that the lost motion connection comprising pin 47 and slot 48 could be eliminated and hence is an optional feature of the invention. To safeguard against inadvertently setting the temperatures on the wrong dials the lost motion connection is provided in the preferred form of the invention which prevents setting a wet bulb temperature into the device which is greater than dry bulb temperatures. If attempted, the interconnection between these two dials causes one to move the other and prevent setting such values into the device. In the example illustrated, dry bulb temperature is set at 59° F., wet bulb at 59° F., pressure at 1013 giving a reading of 100% of standard density as should be expected since the temperatures and pressure conform to the standard reference condition previously referred to. It is to be noted that pin 47 is now at one end of slot 48, hence dial 12 may be rotated counterclockwise to a wet bulb reading less than 59° F., without imparting motion to dial 10. If rotated clockwise, however, pin 47 will rotate all gears thus rotating the previously set dry bulb temperature dial. This again illustrates that pin 47 and slot 48 provide means for preventing setting a wet bulb temperature into the device which is greater than dry bulb temperature.

Since any set of the three measurements: dry bulb temperature, wet bulb temperature and pressure will yield only one correct percentage of standard density it will be apparent that the basic data for constructing the device should be obtained by calculation, charts or meteorological slide rules designed for that purpose. Employing principles of kinematics the various dimensions of parts may then be graphically plotted and the shape of the spiral cam slots determined from a number of points on their curves. The dials may then be graduated empirically to yield a correct end result. In the example illustrated, increments of pressure were uniformly graduated on dial 60 and, with predetermined cam shapes, dials 10, 12 and 16 were finally graduated to provide a correct final reading, these three dials having non-uniform increments. The drawing has been scaled to an actual device hence its dimensions and cam shapes may be employed to construct the invention. If final answers are in error they may be attributed to the various errors in transferring dimensions and shapes from the actual device and suitable corrections may be made by slight departures in the graduations of the scales.

Obviously many modifications and variations of the present invention are possible in the light of the above teachings. It is therefore to be understood that within the scope of the appended claims the invention may be practiced otherwise than as specifically described.

What is claimed is:
1. Apparatus for determining air density from known data consisting of the wet and dry bulb temperatures and pressure of air, which comprises a first movable member graduated to represent dry bulb temperature, a second movable graduated to represent wet bulb temperature, a third movable member graduated to represent air pressure, indices for each of said members to which a graduation on a movable member may be set, a fourth movable member graduated to represent the air density, means mechanically connecting said movable members constructed and arranged to integrate the data which is set on the movable members and produce a reading of air density corresponding thereto on said fourth movable member, and means for preventing the setting of a temperature value on the second movable member which is in excess of that set on the first movable member.

2. Apparatus for determining the percentage of standard air density from known data consisting of the wet and dry bulb temperatures and pressure of air, which comprises; a first rotatable dial graduated to represent dry bulb temperature and a first stationary index for same, a second rotatable dial graduated to represent wet bulb temperature and a second stationary index for same, a third rotatable dial graduated to represent air pressure, a fourth dial rotatable concentric with the third dial graduated to represent percentage of standard air density and having an index to which a graduation on the third dial may be set, the fourth dial being rotatable with the third dial after its index has been set to a graduation on the third dial, a pointer rotatable concentric with the third and fourth dials cooperating with the graduations on the fourth dial, and means mechanically connecting the first, second and third dials and the pointer for moving the pointer to a graduation on the fourth dial corresponding to the preset wet and dry bulb temperatures and pressure.

3. Apparatus in accordance with claim 2 including a friction slip clutch for rotating the fourth dial by the third dial.

4. Apparatus in accordance with claim 2 including means for preventing setting a wet bulb temperature on the second dial which is in excess of that set on the first dial.

5. Apparatus for calculating the single answer to three variables having predetermined values, which comprises a first rotatable graduated dial on which a first variable may be set, a second graduated rotatable dial on which a second variable may be set, a third graduated rotatable dial on which a third variable may be set, a fourth rotatable dial on which said answer may be read, the first and second dials being rotatable about first and second axes and the third and fourth dials being rotatable about a third axis, a pointer rotatable about said third axis cooperating with the graduations on the fourth dial, means for rotating the fourth dial by the third dial after a variable has been set on the third dial, and motion transmission mechanism interconnecting the first, second and third dials for effecting relative rotary movement between the fourth dial and the pointer to move the pointer to the answer on the fourth dial in response to setting the variables on the first, second and third dials.

6. Apparatus in accordance with claim 5 including a first cam rotatable by the first dial, a second cam rotatable by the second dial, a linkage system interconnecting the first and second cams adapted to permit the first and second dials to be rotated independently without transmitting motion one to the other, said linkage system being connected to said third and fourth dials for rotating same in response to rotation of either the first or second dials, and gear means interconnecting said pointer with one of said cams for rotating said pointer in response to rotation of the last named cam.

7. Apparatus in accordance with claim 6 including a lost motion connection connecting the other of said cams with said gear means adapted to rotate said gear means in response to rotation of said other cam after said other cam rotates in excess of the limits of the lost motion connection.

8. Apparatus for calculating the single answer to three variables which are empirically related, which answer is not subject to be readily or precisely determined by mathematical equation, comprising: a first movable member and a first set of graduations associated therewith representing values of a first variable, a first cam operatively connected to the first movable member and movable in direct proportion to movement of the first movable member, said first cam being so shaped and said first set of graduations being so arranged to provide motion inputs which represent the various values of the first variable, a second movable member and a second set of graduations associated therewith representing values of a second variable, a second cam operatively connected to the second movable member and movable in direct proportion to movement of the second movable member, said second cam being so shaped and said second set of graduations being so arranged to provide motion inputs which represent the various values of the second variable, a third movable member and a third set of graduations associated therewith representing values of a third variable and so arranged to provide motion inputs which represent the various values of the third variable, a fourth movable member and a fourth set of graduations associated therewith representing the answers of any predetermined settings of the first, second and third movable members, and motion transmission mechanism, including said first and second cams, operatively interconnecting all of the movable members and adapted to combine the motion inputs of first, second and third members into a motion output imparted to the fourth movable member to move same to a position at which an answer to the three variables may be read, said motion transmission mechanism being further constructed and arranged such that the movement of any of the first, second or third movable members to a predetermined setting and without locking same thereat does not effect movement of the others away from a previous predetermined setting, and means for preventing the setting of a value on the second movable member which is in excess of that set on the first movable member.

References Cited by the Examiner
UNITED STATES PATENTS

| | | | |
|---|---|---|---|
| 1,456,061 | 5/23 | Jowett | 235—61 |
| 1,743,239 | 1/30 | Ross | 235—61 |
| 2,022,275 | 11/35 | Davis | 235—61 |
| 2,444,549 | 7/48 | Anderson | 235—61 |

FOREIGN PATENTS 650,084  9/28  France.

LEO SMILOW, *Primary Examiner.*

A. BERLIN, *Examiner.*